United States Patent [19]
Takagi

[11] Patent Number: 5,363,355
[45] Date of Patent: Nov. 8, 1994

[54] CD-ROM DISC REPRODUCING APPARATUS WITH CLIPPING MEMORY

[75] Inventor: Koji Takagi, Kanagawa, Japan

[73] Assignee: Sony Corporation, Tokyo, Japan

[21] Appl. No.: 43,570

[22] Filed: Apr. 7, 1993

[30] Foreign Application Priority Data

Apr. 8, 1992 [JP] Japan .................................. 4-087334

[51] Int. Cl.$^5$ ............................................. G11B 7/00
[52] U.S. Cl. ........................................ 369/32; 369/33
[58] Field of Search ................... 369/32, 33, 14, 15, 369/20, 22, 75.1, 75.2, 77.1, 77.2, 47, 48

[56] References Cited

U.S. PATENT DOCUMENTS 5,119,353  6/1992  Asakura ................................. 369/13
5,265,083  11/1993  Ishii et al. .......................... 369/75.1

FOREIGN PATENT DOCUMENTS 4301286  10/1992  Japan ................................. 369/75.1

OTHER PUBLICATIONS

Sony Develops Portable Multimedia CD-ROM Player, CD-ROM World, Sep. 1993.

*Primary Examiner*—Robert J. Pascal
*Assistant Examiner*—Tan Dinh
*Attorney, Agent, or Firm*—Limbach & Limbach

[57] ABSTRACT

A CD-ROM disc reproducing apparatus having a search function and a display apparatus (10) which can display data representative of searched results comprises a nonvolatile clipping RAM (12) for storing searched data and a clipping key (13) for allowing a desired data portion of data searched by this apparatus to be freely written on the clipping RAM (12), wherein the data written in the clipping RAM (12) can be accessed at any time and displayed in the display apparatus (10). Therefore, a desired information can be read out arbitrarily with ease and displayed.

9 Claims, 6 Drawing Sheets

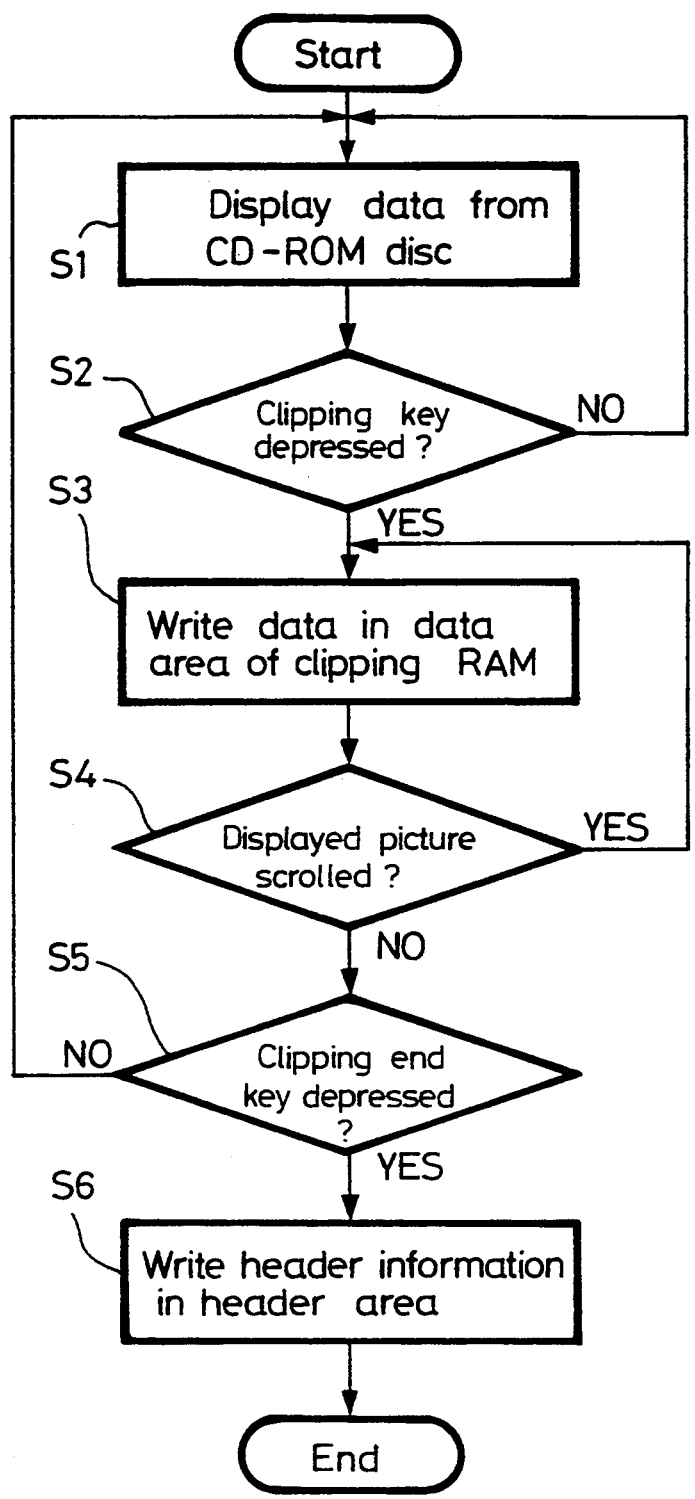

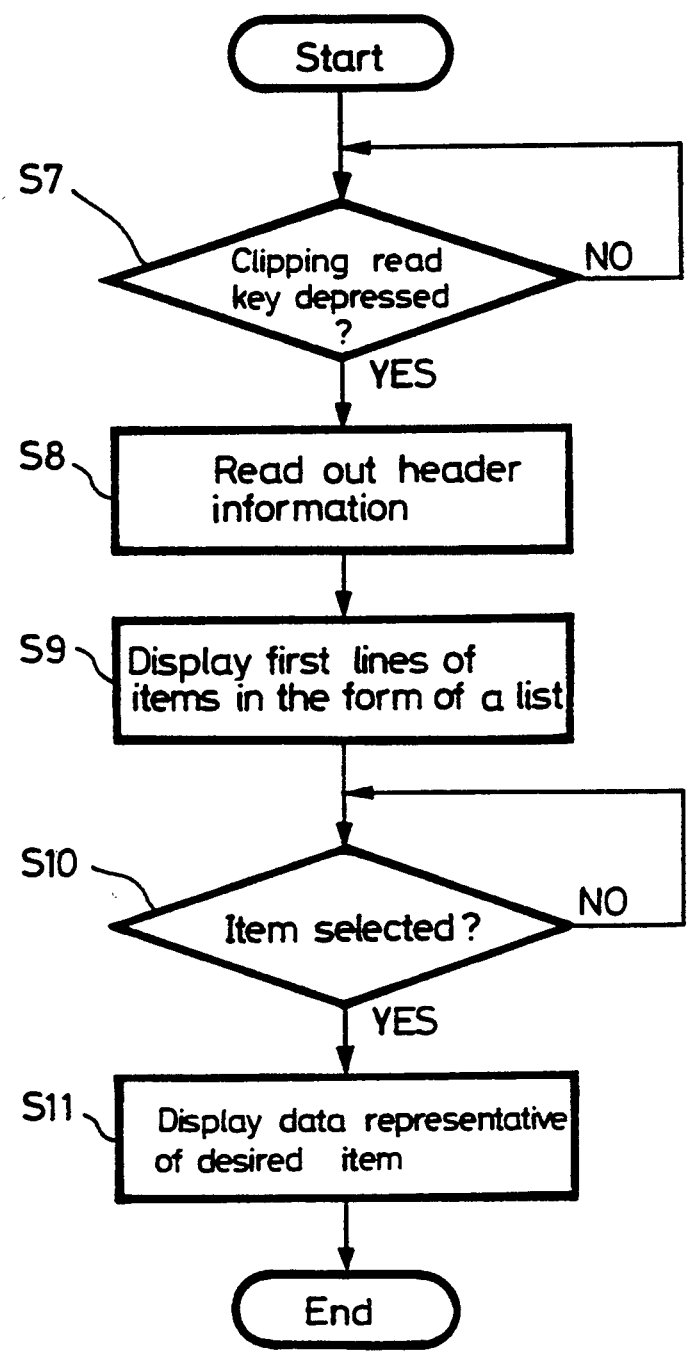

| Type of Data | Top Address of Data Stored in RAM | The Number of Total Bytes of Stored Data |
|---|---|---|

CD-ROM DISC REPRODUCING APPARATUS WITH CLIPPING MEMORY

BACKGROUND OF THE INVENTION

1. Field of the Invention

The present invention relates to a CD-ROM (compact disc read only memory) reproducing apparatus for reproducing a CD-ROM disc on which information such as dictionaries, encyclopedias, road maps, etc., are converted into digital data and recorded on the basis of a compact disc format.

2. Description of the Relevant Art

One conventional optical disc on which publications such as dictionaries, encyclopedias, road maps, etc., are optically recorded as digital data on the basis of a compact disc format is generally referred to as a CD-ROM disc. The CD-ROM discs are recently popularized and receive remarkable attention because a vast number of pages can be recorded on one CD-ROM disc. CD-ROM disc is an optical disc which permits an easy random access and the CD-ROM disc can be reproduced in a non-contact fashion to guarantee a semi-permanent life, etc.

Because the physical characteristics (size, optical characteristics, track pitch, modulation method, etc.) of the CD-ROM disc are in accordance with the CD (compact disc) format, a mechanism of the CD-ROM disc reproducing apparatus serve also as that of a CD player. Therefore, a player that can play both the CD-ROM disc and the CD can be provided by a minor modification such as the addition of a data decoder exclusively used for the above CD-ROM player. The conventional CD-ROM disc reproducing apparatus can search for desired information from the CD-ROM disc loaded thereon and display the desired information thus searched on a display apparatus. The conventional CD-ROM disc reproducing apparatus, however, cannot display the previously-searched retrieved information on the display apparatus when the former CD-ROM disc is changed to another CD-ROM disc. Whenever the user wants to see the same information frequently, the user must change the CD-ROM disc into another one on which such desired information is recorded, which is very cumbersome for the user. Also, when related information is recorded on different CD-ROM discs, the successive CD-ROM discs must be loaded onto the CD-ROM disc reproducing apparatus alternately, which requires excess time for the user to make good use of information recorded on the CD-ROM discs.

OBJECTS AND SUMMARY OF THE INVENTION

Therefore, it is an object of the present invention to provide an improved CD-ROM disc reproducing apparatus in which the aforesaid shortcomings and disadvantages encountered with the prior art can be eliminated.

More specifically, it is an object of the present invention to provide a CD-ROM disc reproducing apparatus in which a desired information can be stored with ease and read out and then displayed if necessary.

It is another object of the present invention to provide a CD-ROM disc reproducing apparatus in which the user is freed from the cumbersome work of changing many CD-ROM discs to retrieve information.

It is still another object of the present invention to provide a CD-ROM disc reproducing apparatus in which the time for accessing desired data or information can be reduced considerably.

It is a further object of the present invention to provide a CD-ROM disc reproducing apparatus in which data (information) relating to data stored in different CD-ROM discs can be read out with ease.

It is a yet further object of the present invention to provide a CD-ROM disc reproducing apparatus in which data or information can be utilized remarkably efficiently.

A CD-ROM disc reproducing apparatus according to the present invention has a search function and can display data representative of the searched results on the display means. This CD-ROM disc reproducing apparatus further includes a nonvolatile memory means for storing the searched and retrieved data and a memory control switch means for freely storing a desired data portion of the searched data in the non-volatile memory means, whereby the data stored in the non-volatile memory means can be accessed at any time and displayed on the display means, regardless of what CD-ROM disc is loaded in the apparatus.

According to the present invention, the CD-ROM disc reproducing apparatus includes the nonvolatile memory means for storing data, wherein desired data can be written and saved in the memory means and accessed at any time and then displayed on the display means. Therefore, the desired data (information) can be read out at any time and displayed on the display means.

According to an aspect of the present invention, there is provided a CD-ROM disc reproducing apparatus which comprises a disc drive means for reproducing data from a CD-ROM disc, a control circuit coupled to the disc drive for controlling operations of the disc drive, an input device coupled to the control circuit for entering data and command signals to the control circuit, a display apparatus for displaying at least the data reproduced from the CD-ROM disc by the disc drive, and a clipping memory coupled to the control circuit for selectively storing at least a portion of the data reproduced from the CD-ROM disc.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which:

FIG. 4 is a flowchart to which references will be made in explaining a control operation done by a central processing unit when desired data is written on a clipping random access memory;

FIG. 5 is a flowchart to which references will be made in explaining a control operation done by the central processing unit when desired data is read out from the clipping random access memory;

DETAILED DESCRIPTION OF THE PREFERRED EMBODIMENT

A CD-ROM disc reproducing apparatus according to an embodiment of the present invention will hereinafter be described with reference to the drawings.

Figure 1:
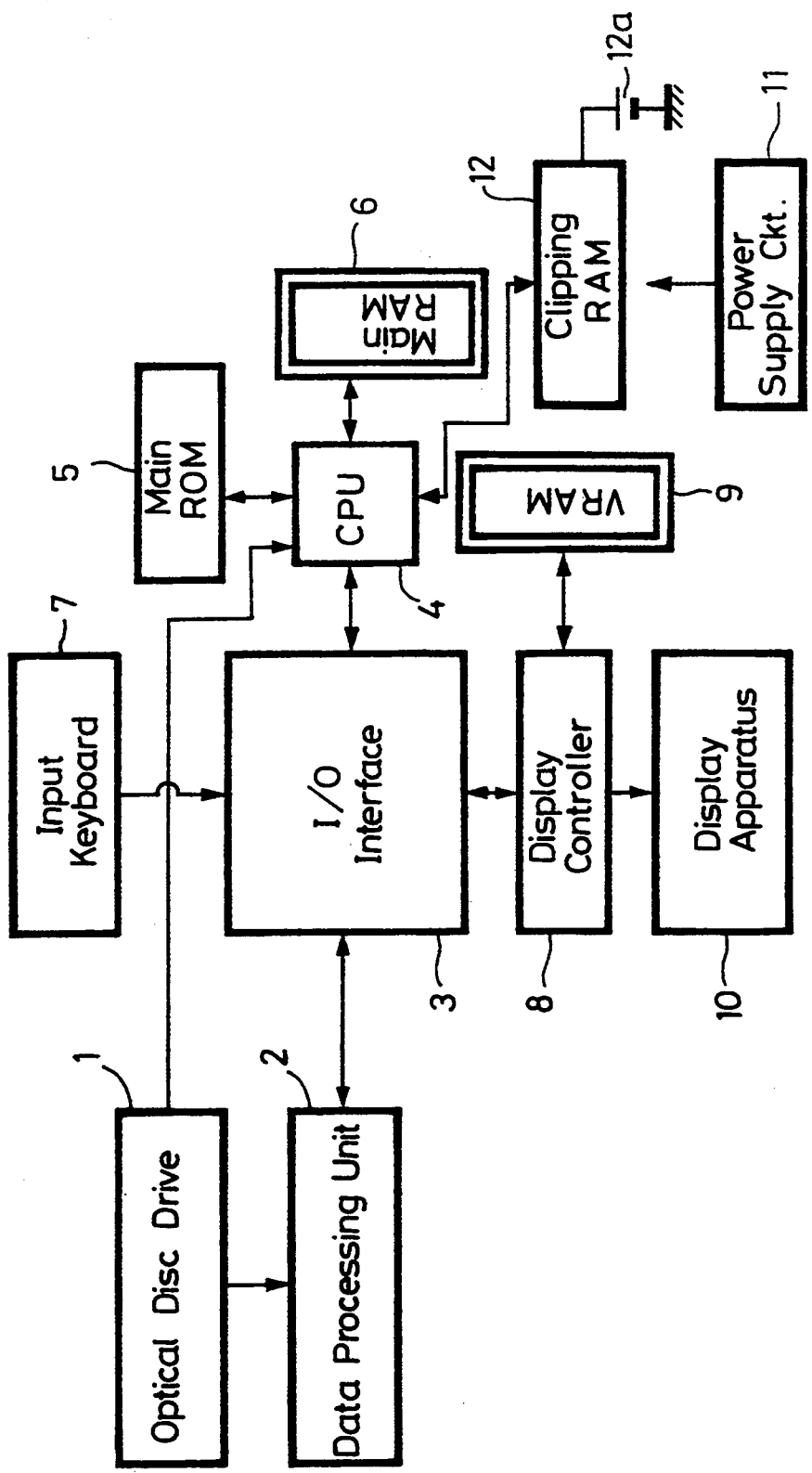
FIG. 1 is a block diagram showing a CD-ROM disc reproducing apparatus according to an embodiment of the present invention.

FIG. 1 of the accompanying drawings shows in block form an arrangement of the CD-ROM disc reproducing apparatus according to the embodiment of the present invention. As shown in FIG. 1, there is provided an optical disc drive 1. Similarly to a well-known CD player, the optical disc drive 1 reads out a signal recorded on a CD-ROM disc (not shown) and supplies a read-out signal to a data processing unit 2. The data processing unit 2 demodulates data stored in the CD-ROM disc and supplies demodulated data to an I/O (input/output) interface 3. The I/O interface 3 is supplied with an operation command signal from an input keyboard 7. The data and the operation command signal are supplied through the I/O interface 3 to a CPU (central processing unit) 4. The CPU 4 controls the entire operation of the CD-ROM disc reproducing apparatus on the basis of a program stored in a ROM (read only memory) 5 coupled thereto. The CPU 4 is further coupled to a RAM (random access memory) 6 in which there is stored the program. A control line is coupled to the CPU 4 so that the CPU 4 supplies the optical disc drive 1 with operation commands such as playback command, search command, stop command or the like.

An output signal from the I/O interface 3 is supplied to a display controller 8 in order to display graphics video data to a display apparatus 10 such as an LCD (liquid crystal display), a CRT (cathode ray tube) display or the like. The display controller 8 is coupled to a VRAM (video RAM) 9 in which there are stored data to be displayed. A power supply circuit 11 supplies an electric power necessary for the aforesaid respective circuits.

An operation of the CD-ROM disc reproducing apparatus thus arranged will be described generally. When a power switch of the CD-ROM disc reproducing apparatus is turned on, the CPU 4 effects a predetermined initialize processing in accordance with the program stored in the ROM 5 and controls the display controller 8 so that a predetermined menu picture is displayed on the display apparatus 10.

When supplied with an arbitrary operation command from the input keyboard 7 by the user, the CPU 4 supplies a search command to the optical disc drive 1 in accordance with the program stored in the ROM 5 to allow the optical disc drive 1 to read out desired data from the CD-ROM disc. The data read out from the CD-ROM disc is temporarily stored in the RAM 6 and the CPU 4 supplies necessary data to the display controller 8 in accordance with the program stored in the ROM 5. The display controller 8 stores data to be displayed in the VRAM 9 and displays the same on the display apparatus 10. The data displayed on the display apparatus 10 is processed in some suitable fashion such as to feed page forwardly, to feed page backwardly, or to scroll a picture or the like under the control of the display controller 8.

In association with the CPU 4, the CD-ROM disc reproducing apparatus of the present invention includes a data storage RAM 12 as nonvolatile memory means that saves data representative of search results. The semiconductor RAM 12 is backed up by a back-up battery 12a coupled thereto.

Figure 2:
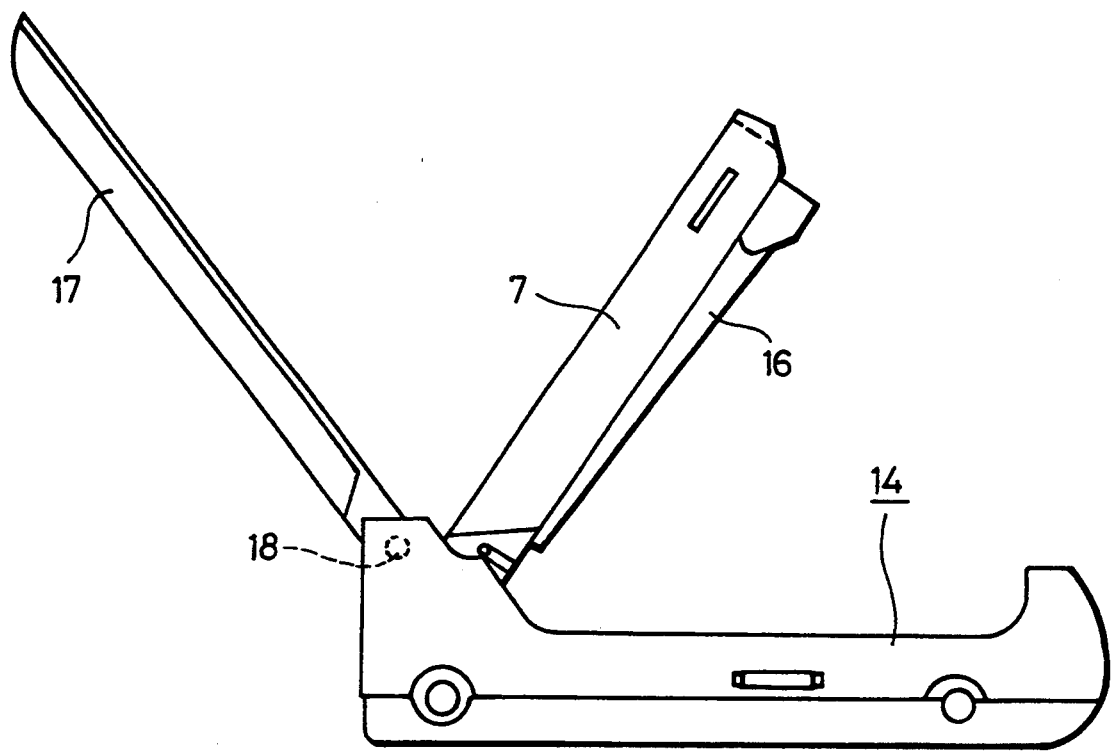
FIG. 2 is a side view showing an appearance of the CD-ROM disc reproducing apparatus shown in FIG. 1.
Figure 3:
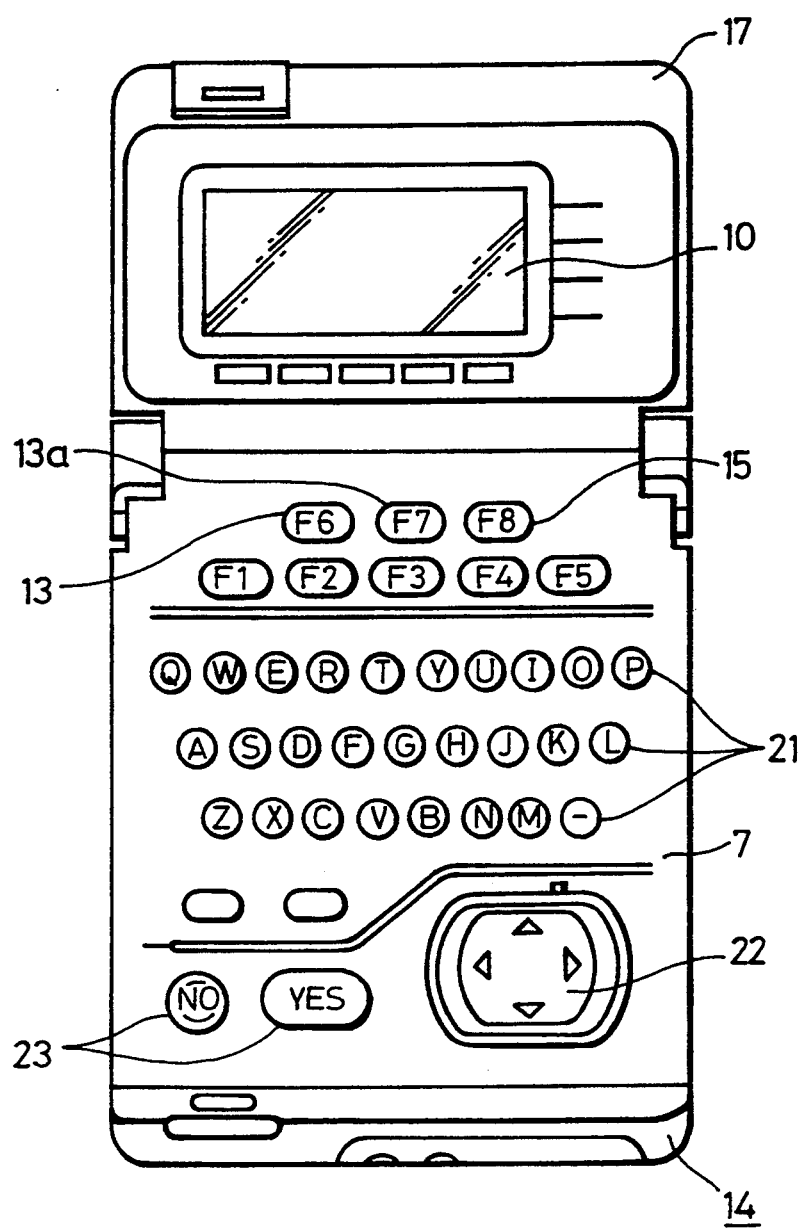
FIG. 3 is a front view showing an appearance of the CD-ROM disc reproducing apparatus shown in FIG. 1.

FIGS. 2 and 3 show an example of an appearance of the CD-ROM disc reproducing apparatus of the present invention.

As shown in FIGS. 2 and 3, an apparatus body 14 incorporates therein the data processing unit such as the data processing unit 2, the I/O interface 3, the CPU 14 or the like except the display apparatus 10 formed of an LCD or the like.

Onto the apparatus body 14, there is loaded a disc cartridge which accommodates therein a CD-ROM disc on which data such as dictionaries, encyclopedias and the like are recorded. As shown in FIGS. 2 and 3, the apparatus body 14 has the input keyboard 7 pivotally supported to a pivot shaft thereof. The input keyboard 7 has arrays of keys such as alphabet keys 21, a cursor move key 22, a select key 23 that selects an selected item pointed by the cursor or the like provided on the front surface when the apparatus body 14 is closed by a lid 17 which will be described later on.

The input keyboard 7 includes on its rear surface opposing the surface having the arrays of the keys a cartridge holder 16 into and/or from which the disc cartridge having the CD-ROM disc accommodated therein is inserted and/or ejected. The cartridge holder 16 is supported to the apparatus body 14 so that it can be rotated in unison with the rotation of the input keyboard 7. The apparatus body 14 further includes the lid 17 rotatably supported to a pivot shaft 18 so that the lid 17 covers the input keyboard 7 to close the upper surface side of the apparatus body 14.

On the inner surface of the lid 17, i.e., on the surface that can oppose the input keyboard 7 when the lid 17 is opened from the apparatus body 14, as shown in FIGS. 2 and 3, there is mounted the display apparatus 10 which contains data which is to be frequently displayed out from the CD-ROM disc.

The lid 17 having the display apparatus 10 is supported to the apparatus body 14 so that, when the CD-ROM disc reproducing apparatus is in use, the lid 17 is rotated to a predetermined position at which the surface of the input keyboard 7 is opened and the displayed screen of the display apparatus 10 become easy to see and then the lid 17 is held at the above position as shown in FIGS. 2 and 3.

When the CD-ROM disc reproducing apparatus is not in use, the lid 17 is closed on the input keyboard 7, whereby the CD-ROM disc reproducing apparatus can be made compact in size and made easy to carry because it is shaped as a square.

According to this embodiment, as shown in FIG. 3, the input keyboard 7 includes a clipping key 13 to write desired data in the clipping RAM 12 and a clipping end key 13a to end the writing of desired data. The input keyboard 7 further includes a clipping read key 15 that is used when desired data (information) is read out from the clipping RAM 12.

A control operation done by the CPU 4 in the CD-ROM disc reproducing apparatus according to this embodiment will be described with reference to flow-charts forming FIGS. 4 and 5.

Figures 6A, 6B:
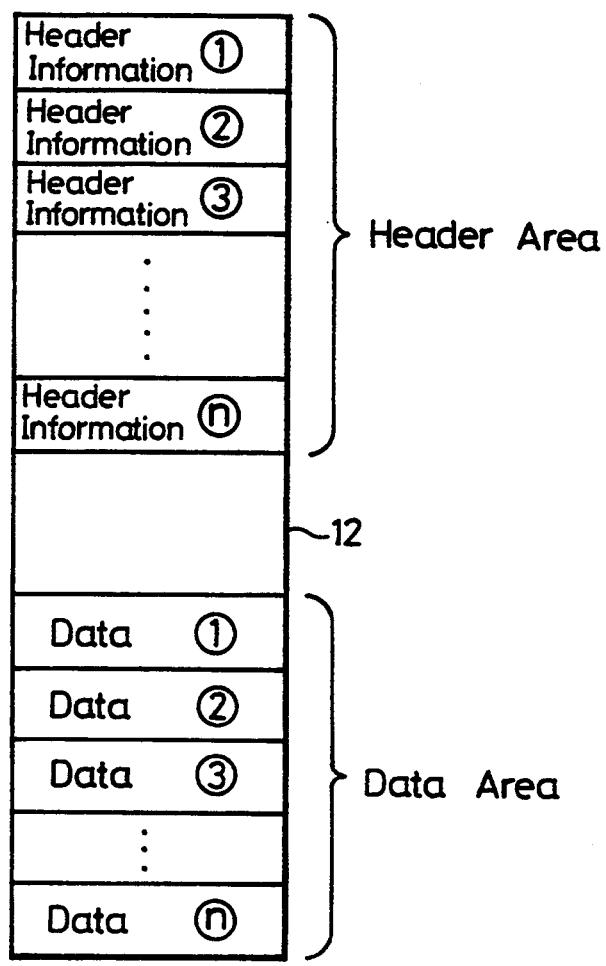
FIG. 6A is a diagram showing header information used in the present invention.
FIG. 6B is a diagram showing the contents of the header information.

Referring to FIG. 4, following the start of operation, a power switch of the CD-ROM disc reproducing apparatus is turned on. Then, data from the CD-ROM disc is searched and desired data is sequentially displayed on the display apparatus 10 at step S1. When the displayed data (information) contains data (information) of high frequency, the clipping key 13 is depressed in step S2. If the clipping key 13 is depressed as represented by a YES at decision step S2, then the processing proceeds to the next step S3, whereat the data now displayed on the display apparatus 10 is written in the clipping RAM 12 at its predetermined position of the data area as shown in FIG. 6A.

When the sequel data is written on the clipping RAM 12, data newly displayed are additionally written on the data area of the clipping RAM 12 by scrolling (in step S4) the displayed picture of the display apparatus 10 at step S3. When the clipping operation is ended, the clipping end key 13a is depressed at step S5. If the clipping end key 13a is depressed as represented by a YES at decision step S5, then the processing proceeds to step S6, whereat a header information formed in response to the data stored is written in the header area of the clipping RAM 12 as shown in FIG. 6A. Then, the processing is ended. As shown in FIG. 6B, the header information comprises a type of data such as characters, images or the like, a top address representative of the position of data stored in the clipping RAM 12 and the number of total bytes of the stored data. Data of necessary number n are written in the clipping RAM 12 in accordance with the flowchart of FIG. 4.

When the data written in the clipping RAM 12 is read out, as shown in the flowchart of FIG. 5, the clipping read key 15 is depressed at step S7. If the clipping read key 15 is depressed as represented by a YES at step S7, a header information written in the header area of the clipping RAM 12 is read out at step S8. Then, the processing proceeds to the next step S9, whereat first lines of all written data are read out from the clipping RAM 12 and displayed on the display apparatus 10 in the form of a list.

In the next step S10, a desired item is selected from the data displayed on the display apparatus 10 in the form of a list. If a desired item is selected as represented by a YES at step S10, then the data of the desired item is displayed by the display apparatus 10 and the processing is ended. If necessary, the user may entitle the data written in the clipping RAM 12 for his choice. In this case, when the clipping read key 15 is depressed, titles are displayed on the display apparatus 10 in the form of a list.

As described above, according to this embodiment, the CD-ROM disc reproducing apparatus includes the clipping nonvolatile RAM 12 which saves the data and the desired data is written in and saved in the clipping RAM 12 and the stored data can be accessed at any time and displayed on the display apparatus 10. Therefore, the desired data can be read out arbitrarily with ease and displayed on the display apparatus 10.

According to the embodiment of the present invention, the cumbersome work for changing the CD-ROM discs is not needed and a time for accessing a desired data can be reduced considerably. Further, since data relating to the data recorded on different CD-ROM discs can be read out with ease, there is then the advantage such that data can be utilized remarkably efficiently.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A CD-ROM disc reproducing apparatus comprising:
   a) disc drive means for reproducing data from a CD-ROM disc;
   b) control means coupled to the disc drive means for controlling operations of the disc drive means;
   c) user controllable input means coupled to the controlling means for entering data and command signals to the control means, including search commands for finding and reproducing data from the CD-ROM disc;
   d) display means for displaying at least the data reproduced from the CD-ROM disc by the disc drive means; and
   e) clipping memory means coupled to the control means for selectively storing at least a portion of the data reproduced from the CD-ROM disc upon entry of a clipping command by the user through the input means.

2. A CD-ROM disc reproducing apparatus as cited in claim 1, wherein the input means includes clipping means for supplying the clipping command to the control means in order to store a desired portion of the data reproduced and displayed on the display means into the clipping memory means.

3. A CD-ROM disc reproducing apparatus as cited in claim 1, wherein the clipping memory means is a semiconductor memory having a predetermined memory capacity.

4. A CD-ROM disc reproducing apparatus as cited in claim 3, wherein the semiconductor memory is a random access memory having a back-up battery.

5. A CD-ROM disc reproducing apparatus as cited in claim 1, wherein the clipping memory means further stores header information relating to the portion of the reproduced data.

6. A CD-ROM disc reproducing apparatus as cited in claim 5, wherein the header information stored in the clipping memory means includes a type of the data, a top address of the stored data in the clipping memory means, and the number of total bytes of the stored data.

7. A CD-ROM disc reproducing apparatus as cited in claim 1, wherein the input means includes read out means for supplying a read out command to the control means in order to read out the data stored in the clipping memory means and display the same on the display means.

8. A CD-ROM disc reproducing apparatus as cited in claim 2, wherein the clipping memory means is a semiconductor, non-volatile memory having a predetermined memory capacity.

9. A CD-ROM disc reproducing apparatus as cited in claim 7, wherein the data stored in the clipping memory means is greater than can be displayed at one time on the display means and wherein the display means includes means for scrolling an image displayed by the display means from data read out from the clipping memory by the read out means.

* * * * *